Figure 1:
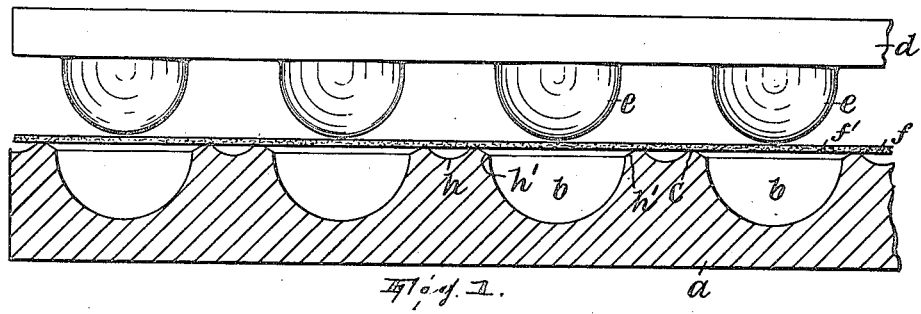

F. A. CIGOL.
METHOD OF FORMING HOLLOW ARTICLES OF RUBBER.
APPLICATION FILED APR. 28, 1913.

1,139,341.　　　　　　　　　　　　Patented May 11, 1915.

WITNESSES　　　　　　　　　　INVENTOR,
　　　　　　　　　　　　　　　Frank A. Cigol,
　　　　　　　　　　　　　　　BY
　　　　　　　　　　　　　　　　　ATTORNEY.

UNITED STATES PATENT OFFICE.

FRANK A. CIGOL, OF PATERSON, NEW JERSEY.

METHOD OF FORMING HOLLOW ARTICLES OF RUBBER.

1,139,341.                   Specification of Letters Patent.     Patented May 11, 1915.

Application filed April 28, 1913.  Serial No. 763,985.

*To all whom it may concern:*

Be it known that I, FRANK A. CIGOL, a citizen of the United States, residing at Paterson, in the county of Passaic and State of New Jersey, have invented certain new and useful Improvements in Methods of Forming Hollow Articles of Rubber, of which the following is a specification.

Hollow rubber articles, such as balls and certain toys, are at present formed by cutting a sheet of unvulcanized rubber into shapes suitable to adapt the pieces to be made to adhere edge to edge and incidentally give the necessary concavo-convex form, thus to build up the particular object being produced. When the hollow object is thus formed it is cured or vulcanized, and as an incident to the curing or vulcanizing process it may be made to set having the shape (such as a sphere) of some mold by having introduced into the articles before it is finally sealed some substance which, under the influence of the heat in the vulcanizing, will produce a gas that will expand and so distend the article to the exact shape of the mold. This method of forming hollow rubber articles is extremely tedious and slow, particularly in respect to those steps thereof which precede the curing or vulcanizing. The object of this invention is therefore to provide a method of forming hollow rubber articles whereby an increased output may be obtained and a better quality of product produced.

According to this invention, having provided a pair of dies formed on their acting faces with any desired number of continuous coacting squeezing surfaces, one (at least) of such coacting surfaces in each instance being suitably narrow and one (at least) of said dies having a recess surrounded by each of its squeezing surfaces, and having interposed between said dies two superposed sheets of unvulcanized rubber, one of which (at least) is bulged more or less into said recess or otherwise spaced from the other in coincidence with the recess, pressure is applied to force the dies together; this operation not only cements the two sheets together around each bulged portion, the joint or seam thus formed being due to the adhesion which accrues in a manner characteristic of unvulcanized rubber when two pieces thereof are pressed against each other, but cuts out from the two sheets the thus-formed hollow body.

The preferred manner of carrying out my improved method will now be described in connection with the forming of a hollow body which is ultimately to be a ball or sphere, reference being had to the accompanying drawing, wherein—

Figure 2:
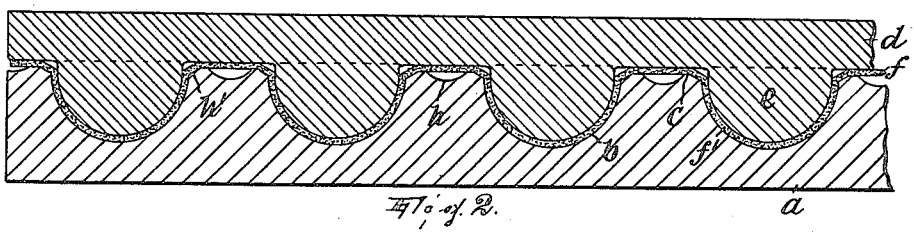
Figure 3:
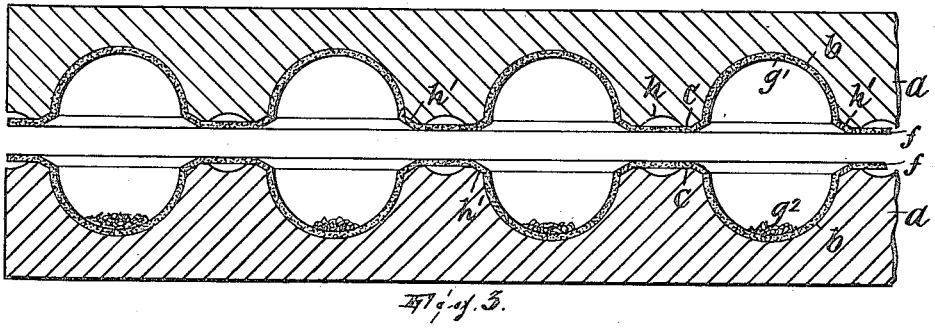
Figures 4, 6:
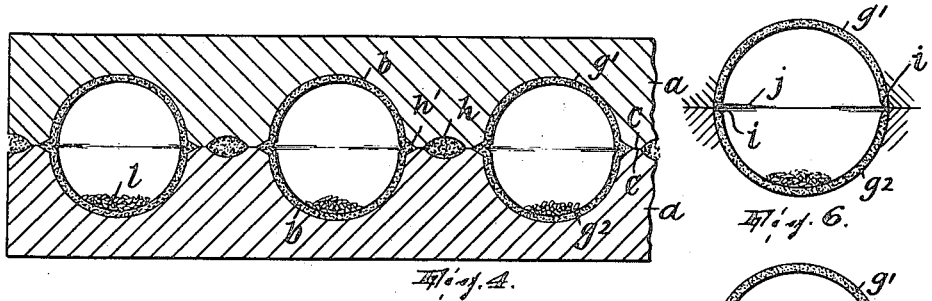
Figures 5, 7:
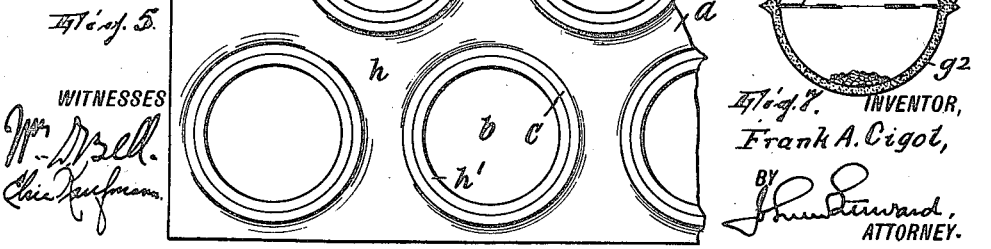

Figure 1 shows one of the dies in section, a sheet of unvulcanized rubber laid thereon and a preliminary forming die above the rubber sheet; Fig. 2 shows the parts appearing in Fig. 1 after the preliminary forming die has been pressed downwardly to produce, in coöperation with the other or main die shown in Fig. 1, concavo-convex portions in the rubber sheet; Fig. 3 shows in section a pair of main dies like that shown in Figs. 1 and 2 and their rubber sheets shaped thereto in the manner illustrated in Fig. 2 before their squeezing surfaces are made to coact on the interposed sheets; Fig. 4 shows the parts shown in Fig. 3 after the dies in that figure have reached the limit of their movement one toward the other; Fig. 5 is a fragmentary plan view of one of the main dies; and, Figs. 6 and 7 are two sectional views of the product, Fig. 6 showing the same when formed regardless of a certain feature of this invention to be explained and Fig. 7 showing the product when formed in the preferred way.

In the present instance each of the main dies *a* is preferably formed as follows: It is a plate of metal having any desired number of hemispherical recesses *b* formed in one face thereof. Around each recess and on the acting face of the die is formed a continuous relatively narrow squeezing surface *c*. The two main dies, with respect to their recesses and the squeezing surfaces, are preferably formed identical, so that when one is inverted and laid upon the other the corresponding recesses and squeezing surfaces in the two plates will exactly coincide with each other.

By any suitable means, as by the preliminary forming die *d* shown in Fig. 1 as having on one face thereof projecting hemispherical knobs *e*, a sheet of unvulcanized rubber *f* imposed upon each main die *a* has the portions *f'* thereof which are opposite the recesses *b* in the main die forced into said recesses. As is well known, due to a characteristic quality of unvulcanized rubber, the relatively bulging portions thus formed in the sheet will remain therein, projecting into the recesses of the die $a$, and the sheet will adhere to the die $a$, for a more or less considerable time after the preliminary forming die $d$ has been removed. One of the main dies $a$, with its thus shaped rubber sheet $f$ adhering thereto, is then inverted and superimposed upon the other main die, having its previously shaped sheet $f$ still remaining thereon, care being taken to bring corresponding recesses and squeezing surfaces of the two dies into exact registry with each other. Pressure is then applied to the two dies, they being forced together until their squeezing surfaces impinge upon each other, or approximately so. In this operation the two rubber sheets are not only cut through in a continuous line around each pair of complementary recesses of the dies, but the squeezing operation causes the complementary parts or walls $g'$ and $g^2$ of the two sheets to be united or cemented together along their margins, the cementing being due to the characteristic quality of two unvulcanized rubber pieces to adhere when subjected to sufficient pressure.

In the plan of the dies the squeezing surfaces $c$ are suitably spaced from each other and a continuous scrap recess $h$ is preferably formed around each squeezing surface of one of both of the dies. In view of this, when the squeezing operation takes place the displacement of the rubber radially inwardly of the coacting squeezing surfaces is equally distributed, as it of course would not be if the scrap recess were not continuous around each pair of coacting squeezing surfaces.

It is preferred that the surface $c$ of each die $a$, which latter in the first instance coacts with the preliminary forming die $d$ to produce a mold, be chamfered next to the recess $b$, as at $h'$. Thus, when the rubber sheet is pressed into recess $b$ by the preliminary forming die and is thus molded into a shape in which it will have a concavo-convex portion therein, instead of the material being unduly thinned around the margin of the recess, as it would be if the angle between surface $c$ and the surface of recess $b$ were sharp—$i.\ e.$, square (see Fig. 6)—it is retained without appreciable thinning at this point. Therefore, when the two dies $a$ thus formed are employed to join the halves of each article and sever them from the sheets in the way described, not only is the material of each sheet of substantially full thickness at the margin of the recess $b$ but the cutting away occurs well outward of the bottom of the groove $j$, which in any case is left interiorly of the article resulting after the severing, the wall of the article after such severing having a bur or rib $k$ formed thereon.

It will be understood that, after the articles have been produced in the manner above described they may be vulcanized or otherwise treated. For instance, in actual practice each of the bulged portions of either sheet will not usually remain a substantially true hemisphere until the squeezing operation can be effected, but it will depart, more or less, from that shape, receding somewhat from the recess. The actual forming of the ultimate product into a true sphere may be accomplished in the vulcanizing process, say by depositing in each bulged portion of the sheet on the lower die before the squeezing operation takes place any substance, as $l$, which, when the article has been formed by my method and has then been introduced into a vulcanizing mold and subjected to heat, will expand as a gas and distend the article to the shape of the mold and retain it so until it has set.

It will be understood that the exterior rib $k$ in Fig. 7 may be obliterated by being flattened out in the vulcanizing mold, or in any other desired manner.

Having thus fully described my invention, what I claim as new and desire to secure by Letters Patent is:—

1. The herein described method of forming hollow articles of rubber consisting in placing a sheet of unvulcanized rubber upon a die having a substantially horizontal top face formed with a series of recesses to whose form the articles to be produced are ultimately to be shaped, forcing the material of the sheet over each recess into the latter and in substantially conforming relation thereto and thereby molding concavo-convex portions in the sheet, placing a gas-forming substance in the thus-formed concavo-convex portions of the sheet, imposing another sheet of unvulcanized rubber face to face with and upon the first sheet, exerting pressure upon the two sheets around each recess in the die sufficient to squeeze them into adhering contact with each other and ultimately sever from the sheets parts including said concavo-convex portions, and finally vulcanizing the parts thus cut from the sheets in a vulcanizing mold.

2. The herein described method of forming hollow articles of rubber consisting in placing a sheet of unvulcanized rubber upon a die having a substantially horizontal top face formed with a series of recesses having chamfered margins to whose form the articles to be produced are ultimately to be shaped, forcing the material of the sheet over each recess into the latter and in substantially conforming relation thereto and thereby molding concavo-convex portions in the sheet, placing a gas-forming substance in the thus-formed concavo-convex portions of the sheet, imposing another sheet of unvulcanized rubber face to face with and upon the first sheet, exerting pressure upon the two sheets around the chamfer of each recess in the die sufficient to squeeze them into adhering contact with each other and ultimately sever from the sheets parts including said concavo-convex portions, and finally vulcanizing the parts thus cut from the sheets in a vulcanizing mold.

In testimony whereof I affix my signature in presence of two witnesses.

FRANK A. CIGOL

Witnesses:
 JOHN W. STEWARD,
 WM. D. BELL.